Sept. 29, 1970      K. A. WALLIS      3,531,614
METHODS OF FORMING METAL TUBING AND/OR APPARATUS THEREFOR
Filed March 31, 1967      3 Sheets-Sheet 1
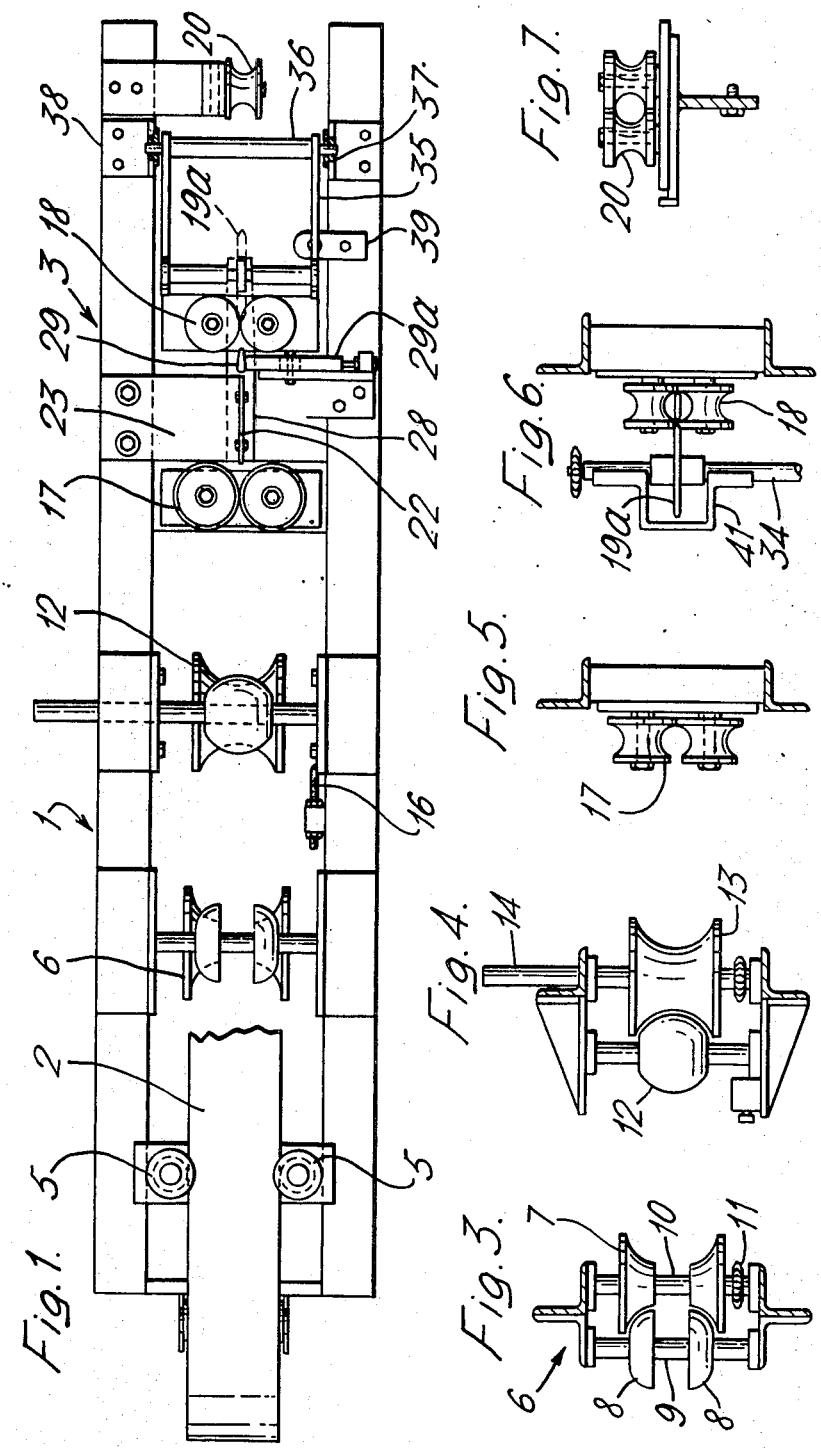

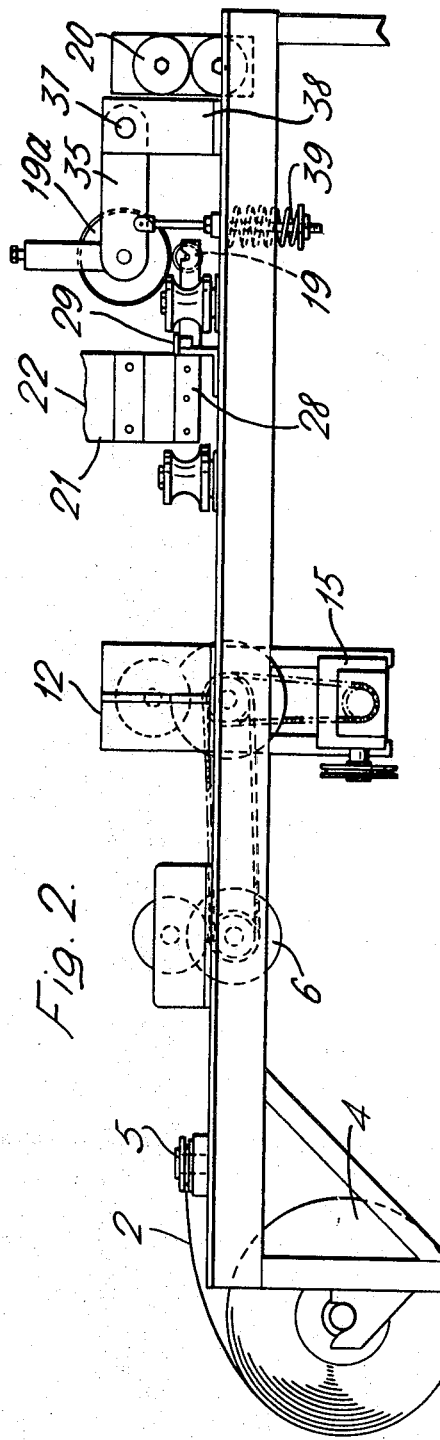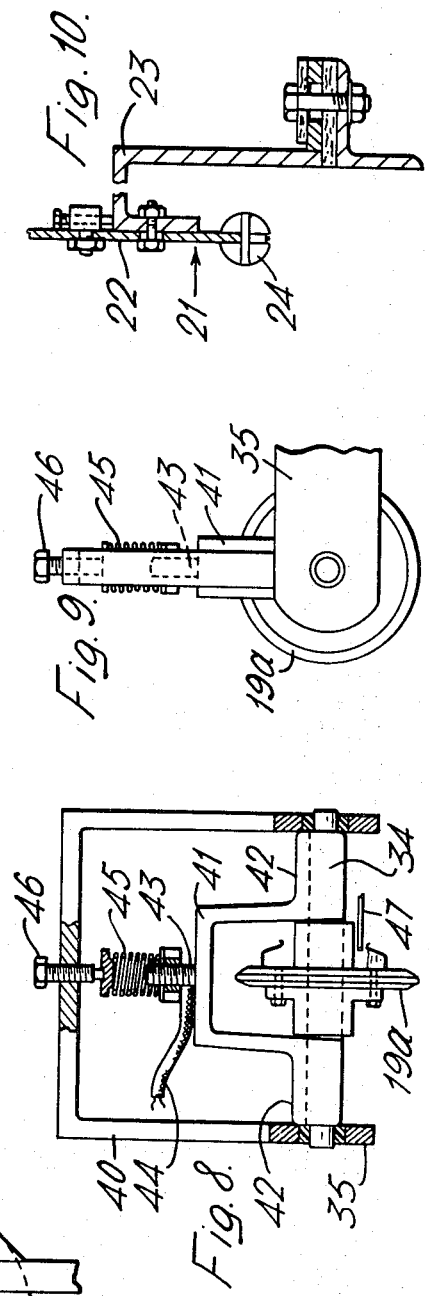

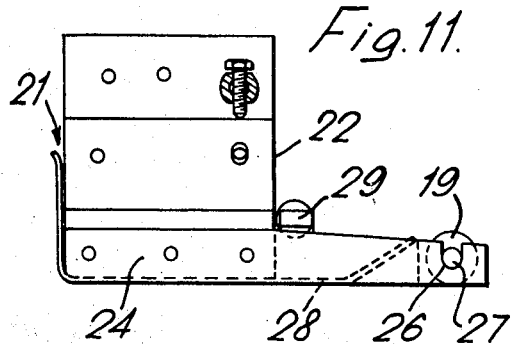
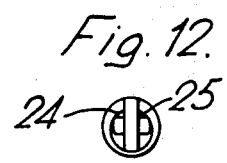
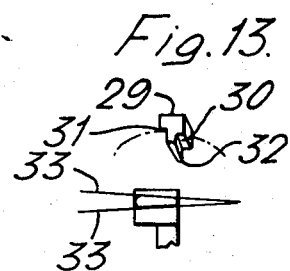
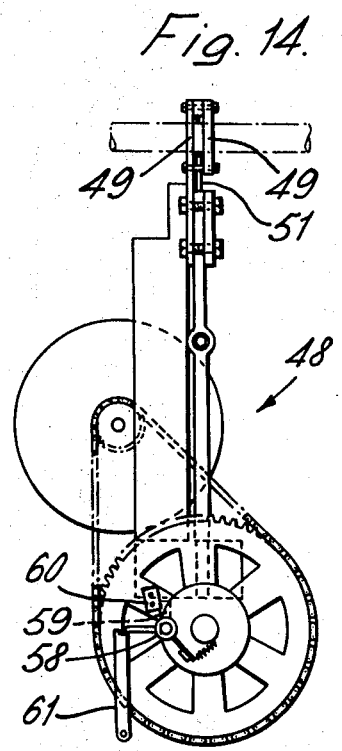
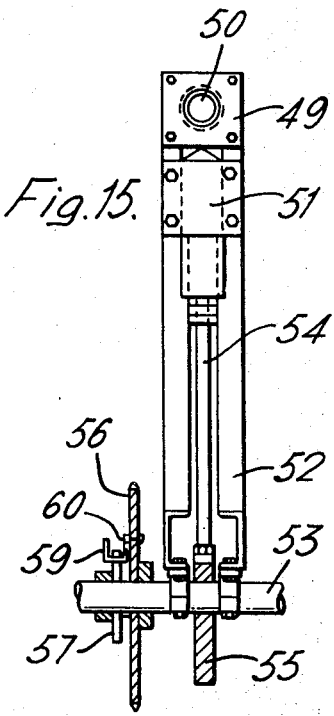

United States Patent Office 3,531,614
Patented Sept. 29, 1970

3,531,614
METHODS OF FORMING METAL TUBING
AND/OR APPARATUS THEREFOR
Kenneth Arthur Wallis, c/o Upright Products Limited,
18 Rongotai Road, Wellington, North Island, New
Zealand
Filed Mar. 31, 1967, Ser. No. 627,361
Claims priority, application New Zealand, Apr. 4, 1966,
144,678
Int. Cl. B23k 1/16
U.S. Cl. 219—66   3 Claims

ABSTRACT OF THE DISCLOSURE

Apparatus for continuously forming tube from a thin strip of metal by folding the strip to a tubular form through a plurality of sets of forming rollers prior to passing the tube through a welding station having an internal and external wheel electrode with the internal electrode supported on an L shaped support member with one arm extending through the converging edges of the formed strip and the other arm extending forwardly through the formed tube with the welding wheel mounted in the end thereof.

---

This invention relates to apparatus for continuously forming metal tubing from a flat strip of metal.

BACKGROUND OF THE INVENTION

To weld an overlapping seam especially in the case of tubes of very thin metal an interior electrode is essential to take up the welding pressure of the external wheel electrode. In the past, the internal electrode has been subject to very heavy wear and even when it is constructed of a special alloy designed for electric resistance welding, it has a short working life and tends to become heavily corroded after welding a few yards of tubing. The wear on the internal roller electrode varies inversely with its diameter which, of course, depends on the inside diameter of the tube being welded. In the case of tubes with an inside diameter of less than about two and a half inches, the wear on the rollers has in the past been excessive.

These difficulties have been approached by using an internal mandrel over which the tube being formed is drawn with a shoe contacting the mandrel to deliver the current. This only allows for an intermittent formation of the tube but the internal mandrel does not form a completely satisfactory interior electrode.

SUMMARY OF THE INVENTION

It is therefore an object of the present invention to provide apparatus for continuously forming metal tubing from a flat strip of metal of relatively light gauge and preferably metal tubing having a diameter of less than three inches.

It is a further object of the present invention to provide an internal wheel electrode operable within tubing to a diameter of one and a half inches which has a relatively long working life with a minimum of maintenance being required.

It is a further object of the present invention to provide apparatus whereby tubes of varying diameters may be formed by adjusting and interchanging minimum components on the apparatus.

It is a further object of the present invention to provide apparatus which will continuously form tubing of the required diameter and allow sections of the tubing to be cut off while the tube is still being continuously formed.

One preferred form of the invention will now be described with reference to the accompanying drawings.

DESCRIPTION OF THE DRAWING

FIG. 1 is a plan view of the apparatus according to the present invention,

FIG. 2 is a side elevation of FIG. 1,

FIG. 3 is an end view of the first set of initial forming rollers,

FIG. 4 is an end view showing the second set of forming rollers,

FIG. 5 is an end view showing the third set of forming rollers,

FIG. 6 is an end view showing the final set of forming rollers and the welding station, FIG. 7 is an end view showing the set of straightening rollers, FIG. 8 is a detail of the external welding wheel electrode, FIG. 9 is a side elevation of FIG. 8 showing part of the pivotal support frame for the external wheel electrode, FIG. 10 is a detail of the mounting platform for the welding transformer and the internal electrode, FIG. 11 is a side elevation of the mounting member for the internal electrode, FIG. 12 is a front view showing the internal welding wheel electrode in position, FIG. 13 is a detail of the positioning means, FIG. 14 is a side elevation of the cut-off mechanism and FIG. 15 is an end view of the cut-off mechanism.

DETAILED DESCRIPTION OF THE INVENTION

In the preferred form of the invention, a frame 1 carries a plurality of sets of forming rollers along the top thereof directing a strip of metal 2 to a welding station 3. The metal strip, for example, is a light gauge stainless steel strip held in a coil 4 on a suitable bracket at the end of the frame 1 and is directed through guide means 5 to a first set of initial forming rollers 6.

The set of forming rollers 6 is adapted to preform the strip adjacent the longitudinal edges thereof to have a radius of curvature substantially the same as the tube being formed. The first set of rollers 6 preferably comprises split female rollers 7 and split male rollers 8 adjustable on shafts 9 and 10 to allow the rollers to be set for varying widths of metal strip which may be formed into a tube of varying diameters by the present apparatus. A drive cog 11 on the shaft 10 provides a drive to this set of rollers.

The second set of rollers 12 is adapted to accommodate the strip without deforming the already preformed edges while further shaping the strip towards the tubular section. A female roller 13 mounted on a shaft 14 is driven by a suitable motor through a reduction gear box 15 with a chain drive extending from the shaft 14 back to the preceding set of rollers 6. Adjustment means 16 are provided on both sets of rollers 6 and 12 to allow the rollers to position parallel one with the other to direct the strip being formed therethrough.

The sets of rollers 6 and 12 thus together comprise sets of complementary male and female rollers having a substantially flat tread and curved sides with the sides shaped to form the side portion of a strip of metal being formed over a range of widths. In this way, varying widths of strip may be accommodated to form varying tube sizes. The sets of rollers 6 and 12 may be replaced by a single set of initial forming rollers with the flanges of the female rollers extended up and away from the male forming rollers to provide a lead-in for the metal being formed. In the preferred form of the apparatus illustrated, an additional range is possible on the apparatus enabling a tube from three inches in diameter to an inch and a half in diameter to be formed with only minor adjustments being required to the initial forming rollers.

A third set of rollers 17 comprises a set of vertically mounted non-drive hour glass rollers to further fold the strip 2 towards the tubular section by deforming the center portion of the strip to have a radius of curvature slightly greater than the tube being formed prior to passing into final forming rollers 18.

The final set of forming rollers 18 also comprise vertically mounted hour glass rollers but in this case the hour glass rollers define a circle slightly larger than the final tube size. As the metal is forced through the final rollers 18, it assumes the tubular shape desired with the required overlap with the edges of the tube ready for passing beneath the welding station.

A set of straightening rollers 20 also comprising hour glass rollers is provided on the opposite side of the welding station. In this case, the hour glass rollers are horizontally mounted and are adjustable to allow for any necessary movement to straighten the tube being formed.

With apparatus as above described, varying widths of strips 2 may be deformed to form various diameters of tube by adjusting the initial forming rollers 6 and replacing the set of final forming rollers 18 and the set of straightening rollers 20 with sets defining the appropriate diameter consistent with the tube being formed. For example, tubing from three inches in diameter to an inch and a half in diameter may be easily formed on this machine. In this way an extremely versatile apparatus is provided which can make varying sizes of small diameter tubing with a minimum of adjustment being necessary.

The forming rollers above described shape the strip of metal into a tubular section having the edges of the metal strip overlapped with the free edges of the strip converging at an angle such that a gap is left prior to the set of final forming rollers 18 with the gap being sufficient to allow access to the interior of the formed strip 2. The angle of convergence of the tube decreases and continues to decrease as the formed strip passes from the final forming rollers 18. A welding station is positioned in front of the final set of forming rollers at a position where the formed strip passes with the edges of the overlapped section substantially parallel.

The welding station 3 is made up of an internal wheel electrode 19 and an external wheel electrode 19a. The internal wheel electrode is supported on an L shaped member 21 with one arm formed by a rectangular plate 22 adapted to extend through between the converging edges of the strip 2. The plate 22 is in turn supported from a platform 23 insulated from the frame 1 and arranged to carry the welding transformer used, with the welding transformer also being electrically connected thereto. The plate 22 is pivotally connected to the platform to allow adjustment in a vertical plane to central the positioning of the internal wheel electrode.

An inner arm 24 of the member 21 comprises a Toban bronze shaft having the top portion tapered adjacent the inner end and fixed adjacent the rear part to the plate 22 by means of suitable rivets.

An electrode mounting head is provided at the inner end and has a longitudinal slot 255 within which the inner wheel electrode 19 rotates and a stopped transverse slot 26 intermediate the length of the longitudinal slot to accommodate an axle 27 supporting the wheel electrode 19. The internal wheel electrode preferably comprises a one and three eighth by five sixteenths one hundred Mallory wheel with an almost flat quarter inch wide tread. The wheel is supported on a nine sixteenth inch hardened shaft knurled at the center with the ends of the shaft rotating in the base of the slot 26. A cooling duct 28 delivers water onto the electrode.

Positioning means is provided to fix the longitudinal position of the edges of the overlapped portion of the strip, and preferably comprises a shoe 29 adjustably supported by a mounting bracket 29a (see FIG. 1). The shoe 29 has shoulders 30 and 31 (see FIG. 13) at a stepped relation one to the other to direct the edges of the overlapped portion one beneath the other. A tapered tongue 32 projects down from the shoulders to engage between converging edges 33 of the strip. The tongue thus acts to guide the seam between the welding wheels and keep the tubular material at the full diameter of the final forming rollers.

The external wheel electrode 19a is carried on a transverse shaft 34 rotatably mounted in bearings in the end of arms 35 of a pivotal support frame 36 which in turn is pivotally mounted in insulated bosses 37 from supports 38 extending from the frame 1. A spring loaded arm 39 is arranged to apply pressure between the wheel electrodes.

An arch 40 extends from the arm 35 to pass above the wheel electrode 19a. A contact yoke 41 also passes over the wheel electrode 19a with shoes 42 engaging with the shaft 34 on either side thereof. A stud 43 extending from the center of the yoke 41 provides an attachment terminal for a flexible transformer lead 44 and a pressure applying spring 45 and adjustment stud 46 allow pressure to be applied from the arch 40 to the contact yoke 41.

A conduit 47 supplies cooling water onto the electrode 19a.

At the end of the apparatus a cut-off mechanism 48 is provided comprising two shearing plates 49 with a circular aperture 50 through each plate, with the apertures being such that they will receive a tube being formed at the welding station. A reciprocal movable shear blade 51 is arranged to move between the plates 49 to cut the tube passing through the apertures 50. The plates 49 are mounted on a frame 52 pivotally supported on a shaft 53. The blade 51 is attached through a connected rod 54 to a crank 55 fixed to rotate with the shaft 53. A disengageable drive is arranged to rotate the crank through a single revolution and thus cause the blade to cut the tube and return to its position as illustrated in the drawings.

The disengageable drive comprises a stop on a driven wheel 56 not directly connected to the shaft 53, driven by a suitable motor (not shown). A wheel 57 connected to the shaft 53 carries an actuating lever 58 which has an arm 59 arranged in one position to engage with a stop 60 attached to the wheel 56. A release arm 61 holds the actuating lever in a position such that the arm 59 is free of the stop 60. When the release arm is pivoted away from the actuating arm and the actuating arm moves to a position such that the lever 59 engages with the stop 60 the driven wheel 56 causes the shaft 53 to rotate. As the revolution of the shaft and crank and operation of the blade 51 is complete, the actuating lever again engages with the release arm moving the arm 59 out of engagement with the stop 60. Pivotal movement of the frame allows an operation to be performed during the welding operation and a safety cut-out is provided so that if the operation is not completed or the blade fouls in any way, all driving and electrical components in the apparatus are stopped.

The use of the above described invention will be clear from the foregoing and a strip of tube having the required width to form the diameter of the tube selected is mounted on the end of the apparatus. The end forming rollers and the final forming rollers and straightening rollers are adjusted or selected to form the tube required.

This strip is fed through the set of initial forming rollers and after it has passed from the set of final forming rollers and through the welding station the apparatus may be commenced to continuously weld the strip. After the strip has emerged from the set of final straightening rollers, it may be cut in any convenient lengths by the cut-off mechanism, with this cut-off mechanism either being manually actuated or electrically actuated after the required length of tube has been formed.

What I claim is:

1. Apparatus for continuously forming metal tube from a flat strip of relatively light gauge metal said apparatus comprising:

initial forming rollers through which the strip is passed to form the edge portion thereof to have a curvature substantially the same as that of the tube being formed;

a further set of forming rollers through which the strip with hte preformed edges passes to shape the strip towards a tubular section, a set of final forming rollers acting as a die through which the formed strip is passed to complete a tubular section having the edges of the metal strip overlapped, with the positioning of the set of final forming rollers relative to the forming rollers being such that the free edges of the strip converge so that a gap is left prior to the set of final forming rollers, to allow access to the interior of the formed strip but with the angle of convergence decreasing;

positioning means mounted before the set of final forming rollers to engage with the longitudinal edges of this strip to position the edges of the overlapped portion;

an insulated support platform positioned prior to the set of final forming rollers;

a welding transformer mounted on said insulated support platform;

an L-shaped member having one arm electrically connected to said welding transformer and extending from said support platform to pass through the gap between the edges of the formed strip prior to the set of final forming rollers and the other arm extending forwardly through said formed strip;

an internal wheel electrode supported adjacent the forward end of the inner arm; and an external wheel electrode positioned relative to said internal electrode to form a welding station at which resistance welding of the overlapped portion of the tube takes place between said electrodes, said welding station being positioned relative to the final set of forming rollers through which the formed strip passes so that the edges of the overlapped section are substantially parallel as they pass through said welding station, said external wheel electrode being mounted on a transverse shaft supported on arms of an insulated pivotal frame, said pivotal frame being biased to apply pressure between said wheel electrodes with said pivotal frame including an arch above said wheel electrode, a yoke contact member having shoes engaged on either side of the shaft supporting the external wheel electrodes to provide an electrical contact to said external wheel electrode and an adjustable biasing means positioned between said arch and said contact yoke with a flexible lead from said transformer connected to said contact yoke.

2. Apparatus for continuously forming metal tube from a flat strip of relatively light gauge metal said apparatus comprising:

a set of split complementary male and female rollers having the side portions adjustable and having a substantially flat tread and curved sides with the sides shaped to form the side portions over a range of widths of metal strips to the required curvature having regard to the tube size being formed, a further set of forming rollers through which the strip with the preformed edges pass to shape the strip towards a tubular section, a set of final forming rollers acting as a die through which the formed strip is passed to complete a tubular section having the edges of the metal strip overlapped with the positioning of the set of final forming rollers relative to the preforming rollers being such that the free edges of the strip converge so that a gap is left prior to the set of final forming rollers to allow access to the interior of the formed strip but with the angle of convergence decreasing, a hardened show with two shoulders at a stepped relation one to the other and a tongue extending between said shoulders to provide an abutment against which the edges of the converging strip abut, a supporting arm adjustably carrying said shoe, an insulated support platform positioned prior to the set of final forming rollers, a welding transformer mounted on said insulated support platform, an L-shaped member having one arm electrically connected to said welding transformer and extending from said support platform to pass through the gap between the edges of the formed strip prior to the set of final forming rollers and another arm projecting forwardly through said strip, an internal wheel electrode rotatable in a longitudinal slot out in the end of said arm and supported on an axle rotatable in a stopped transverse groove in said arm intermediate of said longitudinal groove, an external wheel electrode positioned relative to said internal electrode to form a welding station at which resistance welding of the overlapped portion of the tube takes place between said electrodes, said welding station being positioned relative to the final set of forming rollers through which the formed strip passes so that the edges of the overlapped section are substantially parallel as they pass through said welding station, a set of straightening rollers and cut-off means, said cut-off means including a reciprocably operable shearing knife, a pivotal frame, two shaped shearing plates each having a clearance circular aperture for the formed tube supported in said pivotal frame, a reciprocable shearing blade operable to move between the shearing plates past the circular aperture, a crank adapted upon a single rotation to move the shearing blade past the circular aperture and back to a position where the knife is clear of said circular aperture and a disengageable drive means adapted to rotate the crank through a single revolution before disengagement said disengageable drive means in turn comprising a driven wheel, a stop on said driven wheel, an actuating lever, a release arm holding said actuating lever in a position free of said stop, biasing means to bias said actuating lever to move to a position to engage with the stop when released from said release arm and biasing means to return said release arm to a position to re-engage with said actuating lever to cause it to disengage from stop after a single revolution.

3. Apparatus for continuously forming metal tube from a flat strip of relatively light gauge metal said apparatus comprising:

a set of complementary male and female rollers having a substantially flat tread and curved sides with the sides shaped to form the side portion of a range of widths of strip to the required curvature having regard to the tube size being formed, a further set of forming rollers through which the strip with the preformed edges pass to shape the strip towards a tubular section, a set of final forming rollers acting as a die through which the formed strip is passed to complete a tubular section having the edges of the metal strip overlapped with the positioning of the set of final forming rollers relative to the preforming rollers being such that the free edges of the strip converge so that a gap is left prior to the set of final forming rollers to allow access to the interior of the formed strip but with the angle of convergence decreasing, a hardened shoe with two shoulders at a stepped relation one to the other and a tongue extending between said shoulders to provide an abutment against which the edges of the converging strip abut, a supporting arm adjustably carrying said shoe, an insulated support platform positioned prior to the set of final forming rollers, a welding transformer mounted on said insulated support platform, an L-shaped member having one arm electrically connected to said welding transformer and extending from said support platform to pass through the gap between the edges of the formed strip prior to the set of final forming rollers and another arm projecting forwardly through said strip, an internal wheel electrode rotatable in a longitudinal slot cut in the end of said arm and supported on an axle rotatable in a stopped transverse groove in said arm intermediate of said longitudinal groove, an external wheel electrode positioned relative to said internal electrode to form a welding station at which resistance welding of the overlapped portion of the tube takes place between said electrodes said welding station being positioned relative to the final set of forming rollers through which the formed strip passes so that the edges of the overlapped section are substantially parallel as they pass through said welding station, a cut-off means comprising a pivotal frame, two shaped shearing plates each having a clearance circular aperture for the formed tube supported on said pivotal frame, a reciprocable shearing blade operable to move between the shearing plates past the circular aperture, a crank adapted upon a single rotation to move the shearing blade past the circular aperture and back to a position where the knife is clear of said circular aperture, and a disengageable drive means adapted to rotate the crank through a single revolution before disengagement, said disengageable drive means in turn comprising a driven wheel, a stop on said driven wheel, an actuating lever, a release arm holding said actuating lever in a position free of said stop, biasing means to bias said actuating lever to move to a position to engage with the stop when released from said release arm and biasing means to return said release arm to a position to re-engage with said actuating lever to cause it to disengage from said stop after a single revolution.

References Cited

UNITED STATES PATENTS

| 3,263,053 | 7/1966 | Rudd | 219—59 |
| 2,177,104 | 10/1939 | Gosner | 219—64 X |
| 2,390,971 | 12/1945 | Vang | 219—66 X |
| 2,444,465 | 7/1948 | Peters | 219—64 X |

FOREIGN PATENTS

| 263,783 | 3/1927 | Great Britain. |

ANTHONY BARTIS, Primary Examiner

P. W. GOWDEY, Assistant Examiner